Nov. 18, 1969  J. A. MORANDO  3,478,694
HIGH-SPEED, SELF-BOOSTING GEAR PUMP
Filed May 17, 1968  2 Sheets-Sheet 1
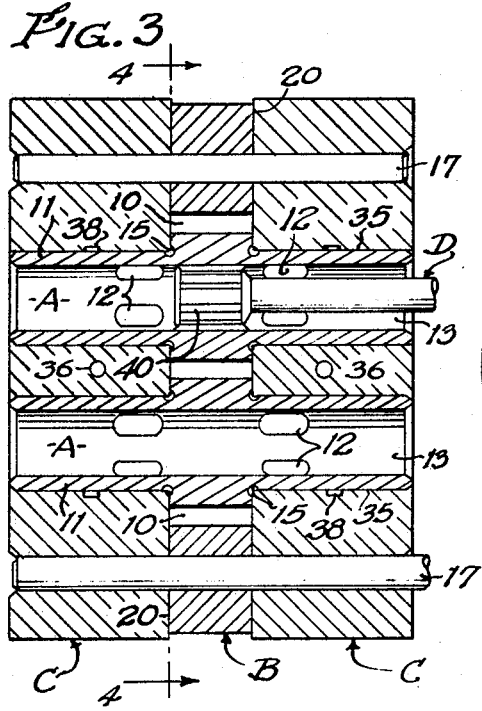
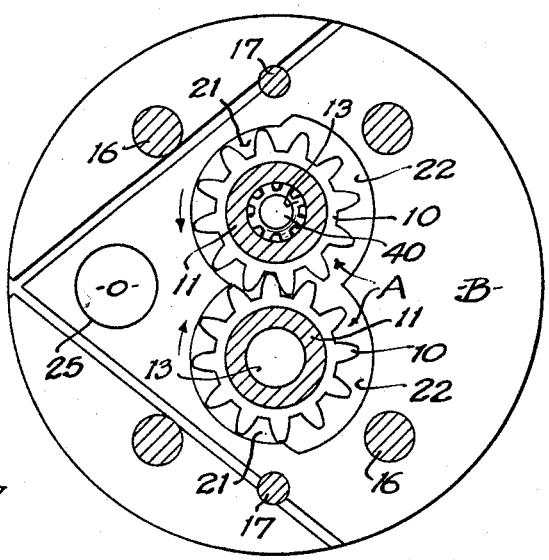
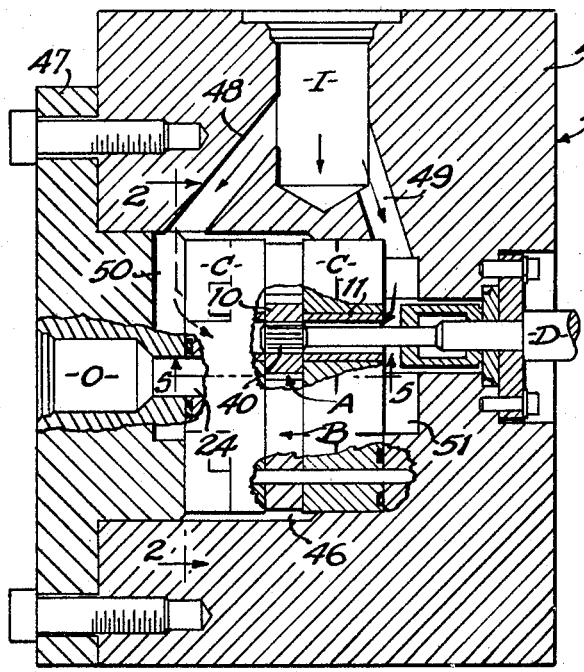
INVENTOR.
JORGE A. MORANDO
BY
Lynn H. Latta
-ATTORNEY- Nov. 18, 1969  J. A. MORANDO  3,478,694
HIGH-SPEED, SELF-BOOSTING GEAR PUMP
Filed May 17, 1968  2 Sheets-Sheet 2
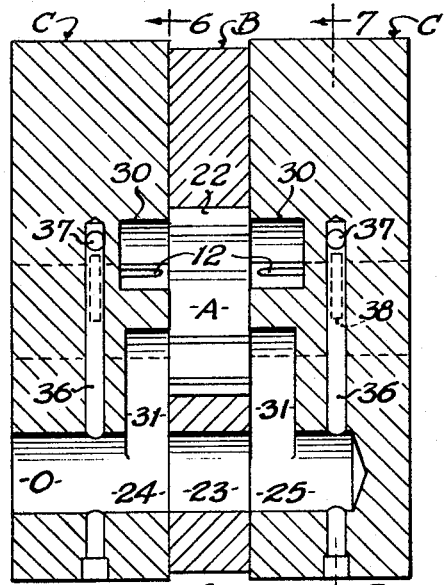
FIG.5
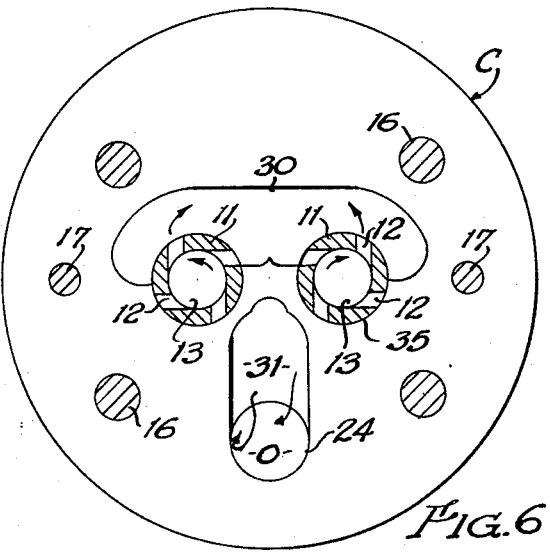
FIG.6
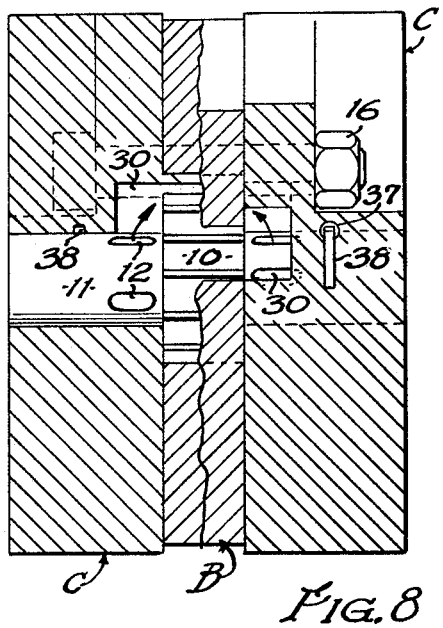
FIG.7
FIG.8
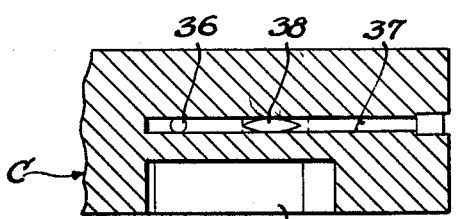
FIG.9
INVENTOR.
JORGE A. MORANDO
BY Lynn N Latta
-ATTORNEY-

United States Patent Office 3,478,694
Patented Nov. 18, 1969

3,478,694
HIGH-SPEED, SELF-BOOSTING GEAR PUMP
Jorge A. Morando, Burbank, Calif., assignor to Crane Co., doing business as Hydro-Aire Division, Burbank, Calif., a corporation of Illinois
Filed May 17, 1968, Ser. No. 730,007
Int. Cl. F04c 1/08
U.S. Cl. 103—126                                8 Claims

ABSTRACT OF THE DISCLOSURE

A high-speed gear pump having inlet flow through tubular gear shafts which embody centrifugal pumping windows to pump the entering liquid into the inlet chamber which feeds the gears, thus eliminating the need for a separate inlet booster pump.

BACKGROUND OF THE INVENTION

Gear pumps operating at very high speeds have been utilized heretofore, but because of the centrifugal action of the rotating gears opposing the flow in the inlet, they have required the use of a booster pump at the inlet.

The two problem areas encountered when designing a gear pump to operate at very high speeds and pressures are:
(1) Inlet cavitation
(2) Journal bearing loads These problems are usually overcome by providing a centrifugal booster pump to pressurize the gear pump inlet fluid; and by providing oversized journal bearings.

The problem increases with increasing speed because the centrifugal action exerted by the gears in the pumped fluid prevents the fluid from filling the spaces between the teeth. At 100,000 RPM, a 1.00 in. outside diameter gear develops (by centrifugal force) a theoretical head equal to $$H = \frac{O.D. \times R.P.M.^2}{1840} = 2960 \text{ ft.}$$

or 1280 p.s.i.

where:
H=Ft. of water
O.D.=Gear outside diameter
R.P.M.=Revolutions per minute

This imposes a booster pump larger than the gear pump itself. The second problem is that during starting or low-speed conditions, the journal bearings can not develop a hydro-dynamic film and consequently the design has to be compromised by designing the bearing for low speed operating conditions which usually forces the gear to increase in diameter and again affecting the inlet conditions.

OBJECTS OF THE INVENTION

The general object of the invention is to improve the construction and operation of high-speed gear pumps. Specific objects are:

(1) To eliminate the need for a separate inlet booster pump;

(2) To attain a more compact and lightweight construction embodying inlet booster means;

(3) To embody self-contained inlet booster mechanism within a gear pump;

(4) To minimize the effect of centrifugal force in opposing inlet flow into the pump;

(5) To utilize combined hydrostatic-hydrodynamic action in the operation of the journal bearings of the pump, such that a stable, constant center of rotation is achieved through a position load on lubrication films within the journals.

SUMMARY OF THE INVENTION

The foregoing objects are achieved by this invention as follows:

Fluid enters the pump through the center of tubular gear shafts which allow the free passage of fluid. At the shaft centers there is no centrifugal effect preventing the fluid entrance and in addition the available fluid inlet area is increased (when compared to standard designs) by the fact that fluid enters the pump from four different directions. When the fluid reaches the specially machined slots or windows in the tubular shafts, it will be pumped to the pump inlet by the centrifugal impeller effect of the windows.

With the fluid entering radially outwardly from the center, the gear faces and teeth will also act as centrifugal impellers helping to pressurize the fluid and force it's way into the gear teeth cavities.

In this design, the head developed by the gears' centrifugal action is used to force feed the pump inlet, while in standard designs, it has to be overcome to be able to fill the pump.

IN THE DRAWINGS

FIG. 1 is a sectional view of a pump assembly embodying the invention, the pump unit being shown largely in elevation, partially broken away;

FIG. 2 is an end view of the pump unit with a portion of the housing shown on line 2—2 of FIG. 1;

FIG. 3 is a sectional view in the common plane of the axes of the two impeller gear units;

FIG. 4 is a cross-sectional view of the pump unit, taken on line 4—4 of FIG. 3;

FIG. 5 is a sectional view taken on line 5—5 of FIG. 2;
FIG. 6 is a sectional view taken on line 6—6 of FIG. 5;
FIG. 7 is a sectional view taken on line 7—7 of FIG. 5;
FIG. 8 is a sectional view, taken in several planes as indicated by branching line 8—8 of FIG. 7; and
FIG. 9 is a detail sectional view taken on line 9—9 of FIG. 7.

DESCRIPTION

Referring now to the drawings in detail, I have shown therein, as an example of one form in which the invention may be embodied, a gear pump comprising, in general, a pair of impeller gear units A operating in a pump chamber within a spacer-liner B between two side plates C, these parts being assembled within a housing H which has an inlet I (FIG. 1) and an outlet O. A drive shaft D transmits drive to impeller gear units A from a suitable rotatable driving device which may be a motor or turbine or other equivalent device.

Gear units A embody respective impeller gears 10 which may be of conventional involute tooth spur gear design, intermeshing as in conventional gear pumps to drive the entrained fluid in the direction in which their teeth approach intermesh, as indicated by the arrows in FIG. 4. Formed integrally with the gears 10 are tubular shaft trunnions 11 which project axially in both directions from the plane of the gears. In the trunnions 11 are formed inlet-pressurizing windows 12 in annular arrays on both sides of the respective gears and adjacent thereto. Each window 12 is in the form of a slot extending tangentially from the periphery of a cylindrical inlet passage 13 (FIG. 6) defined within the respective trunnion. The sides of each window 12 are inclined with reference to a radius intersecting the slot, in a trailing direction with reference to the direction of rotation, i.e. away from rather than towards the direction of rotation. Hence the windows 12 function as vanes of a centrifugal impeller, to pump fluid outwardly from inlet passage 13 through the walls of trunnions 11.

In the annular corners between trunnions 11 and the respective faces of gears 10 the gear units A are provided with toroidal relief grooves 15 separating the bearing surfaces of the trunnnons 11 from the end-bearing faces of the gears 10.

Spacer-liner B is a circular block having parallel side faces closely fitted to side faces 20 of the embracing side plates C, which close the respective sides of circular pumping chambers 21 (FIG. 4) formed as intersecting apertures in the block. The chambers 21 on one side of their common diameter have cylindrically arcuate walls to which the teeth of impeller gears A are fitted with a close though freely slidable fit. On the other side of their common diameter, the chambers 21 are enlarged into inlet chambers 22 which are concentric with chambers 21 and function to transmit pressurized inlet flow thereto as hereinafter described.

Side plates C are secured to space-liner block B in sandwich assembly, by bolts 16, which extend through bores in the parts and clamp the parts together with the inner faces 20 of side plates C sealed to the opposite faces of spacer block B, the abutting faces being flat and highly finished. Accurate register of the three parts is attained by positioning pins 17, likewise extending through snugly-fitting bores in the three parts. Spacer liner B has an opening 23 registering with bores 24 and 25 in side plates C to cooperatively define a portion of outlet O within the pump unit.

Side plates C (FIGS. 5 and 6) are provided with inlet collector volute chambers 30 which are radially aligned with windows 12 so as to receive the inlet-pressurizing discharge therefrom. Volute chambers 30 are formed in the inner sides of end plates C, opening into the faces 20 which abut the spacer B. They are positioned in registering relation to inlet chambers 22 of spacer block B, and with the spaces between the teeth of gears 10 on the inlet side of the pump. Consequently, fluid is force-fed into inlet chambers 22 and inlet cavitation is overcome and prevented.

Each side plate C has, in its inner side, an outlet duct 31 extending radially into communication with a respective outlet bore 24, 25.

Trunnions 11 are rotatably fitted in bores 35 in end plates C, to provide journals which have a hydrostatic-hydrodynamic operation, provided by feed-back of fluid from outlet bores 24 and 25. To this end, feed-back passages 36 (FIG. 5 and 7) extend from bores 24, 25 to branching passages 37 which in turn communicate with crescent-shaped distributor grooves 38 opening into the journal bores 35 approximately midway of the length of trunnions 11. Grooves 38 are positioned diametrically opposite to the area where the fluid pressure generated by the gears loads the gear units A. Thus fluid from discharge outlet O is fed back into journal bores 35. The journal width is such that the pressure applied to each trunnion in its groove 38 will slightly exceed half the back load on the gears developed by the pumping action. Thus the feed-back pressure will completely balance the pumping pressure load except for a small resultant in the opposite direction. This small value of unbalance will be proportional to the operating pressure and can be made small enough so that at starting or low speed operating condition it will not prevent the forming of a hydrodynamic film large enough to ensure safe operation. The reason for creating a slight unbalance is to insure a constant center of rotation for the shaft and prevent an unstable shaft (center hunting) for lack of a positioning load.

Since the pressurizing grooves are in the middle of the journal width, the average pressure action on the journal will be approximately half of the discharge pressure.

Another advantage gained with this journal design is that the fluid flow supplied to the journal acts also as bearing coolant flow, a very impotrant requirement when operating at very high speeds. The loss is pump volumetric effeciency due to this extra flow loss is negligible for pump flow requirements over 1.00 g.p.m. at 3000 p.s.i. pressure rise.

Drive shaft D extends through one of the hollow trunnions 11 and has a splined head 40 coupled to internal splines within the corresponding gear unit A.

Housing H may comprise a case 45 having a cylindrical recess 46 receiving the pump unit. A closure cap 47 closes the open side of recess 46 and has the outlet O, to which outlet bore 24 is connected. Branching inlet passages 48 and 49 extend from inlet I to respective inlet ducts 50 and 51 in cap 47 and case 45. Ducts 50 and 51 communicate with the open ends of trunnions 11, to feed fluid thereinto.

OPERATION

Gear units A, rotating in response to high speed drive transmitted through shaft C, will receive fluid at the open ends of their four trunnions, and will pump the incoming fluid through windows 12 into volute chambers 30 so as to pressurize the inlet chambers 22 communicating with chambers 30. Since centrifugal force is minimal in trunnion passages 13, it will not offer any substantial opposition to the inflow of fluid in trunnions 11.

The pressurized fluid in volute chambers 30 will fill the inlet chambers 22 and the spaces between the teeth of gears 10 under pressure, thus avoiding cavitation even at extremely high speeds, since the higher the speed, the greater will be the pressurizing effect.

The fluid entering inlet chambers 22 will be carried by the gear teeth around to the outlet ducts 31, through which it is discharged by the gears into outlet O. A small portion of the discharged fluid will be fed back through passages 36 and 37 and grooves 38 to journal bores 35 to balance and center the trunnions 11 in their bores.

I claim:
1. In a high-speed gear pump; in combination:
a pair of gear units embodying gear elements and shaft trunnions;
at least one of said trunnions being tubular and having windows operable with a centrifugal pumping action upon rotation of said gear units in the operation of said pump;
means enclosing said gear elements and providing a pumping chamber, an inlet chamber and an outlet, for gear-pumping operation;
means enclosing said trunnions and providing a collecting chamber for receiving the discharge of said windows;
means for directing said discharge into said inlet chamber to provide a pressurized inlet flow to said gears;
and means providing a pump inlet communicating with said tubular trunnion for inflow of fluid to the pump through said hollow trunnion.

2. A pump as defined in claim 1, wherein there are four of said trunnions all of which are tubular;
said pump inlet means including inlet connections to at least three of said trunnions;
said three trunnions all having said pumping windows;
and a drive shaft having a driving connection to the fourth trunnion for driving said gears.

3. A pump as defined in claim 2, wherein said drive shaft includes a stem extending axially through said fourth trunnion and having a driving head within the gear of the gear unit having said fourth trunnion;
said stem having radial clearance relative to the inner wall of said fourth trunnion so as to provide an annular inlet passage therein;
and said pump inlet means including an inlet connection for said fourth trunnion.

4. A pump as defined in claim 3, wherein said gear element-enclosing means comprises:
a spacer block having openings receiving said gears and defining the peripheries of said pumping and inlet chambers;

and end plates secured to the respective faces of said spacer block in a sandwich structure, there being two of said collecting chambers, in the form of recesses in the respective end plates.

5. A pump as defined in claim 4, wherein;
said spacer block, end plates and gear units are secured to one another to constitute a pump unit;
and wherein said pump inlet means comprises a housing enclosing said pump unit.

6. A pump as defined in claim 1, wherein there are four of said trunnions, all of which are tubular;
said gear element-enclosing means comprising a sandwich structure of spacer block and end plates secured to respective sides thereof;
said pumping and inlet chambers being defined within said spacer block;
there being two of said collecting chambers, defined within the respective end plates in direct laterally communicating relation to said inlet chamber;
and said pump inlet means comprising a housing enclosing said sandwich structure and having respective inlet ducts communicating with open ends of said trunnions.

7. A pump as defined in claim 1, wherein there are four of said trunnions, all of which are tubular;
said gear element-enclosing means comprising a sandwich structure of spacer block and end plates secured to respective sides thereof;
said pumping and inlet chambers being defined within said spacer block;
there being two of said collecting chambers, defined within the respective end plates in direct, laterally communicating relation to said inlet chamber;
and said pump inlet means comprising a housing enclosing said sandwich structure and having respective inlet ducts communicating with open ends of said trunnions;
said trunnions extending through substantially the full thickness of said end plates and said open ends being substantially flush with the outer faces of said end plates.

8. A pump as defined in claim 1, wherein there are four of said trunnions, all of which are tubular;
there being two of said collecting chambers in direct, laterally communicating relation to said inlet chamber;
and said pump inlet means comprising a housing enclosing said gear element-enclosing means and having respective inlet ducts communicating with open ends of said trunnions;
said enclosing means having bearing bores receiving said trunnions and fitted thereto to provide bearing journals;
and said enclosing means having arcuate journal-pressurizing grooves in said bores, in direct communication with the outer surfaces of said journals, and having passage means for feeding back a portion of the gear-pumping discharge from said outlet to said grooves, for pressurizing of said journals with fluid films between said trunnions and the internal bearing walls of said bores.

References Cited

UNITED STATES PATENTS

| | | |
|---|---|---|
| 2,416,987 | 3/1947 | Fleischer. |
| 2,471,915 | 5/1949 | Thacher. |
| 2,500,719 | 3/1950 | Ungar. |
| 2,746,394 | 5/1956 | Dolza et al. |
| 2,818,023 | 12/1957 | Lundstrom. |
| 3,076,413 | 2/1963 | Hoffer. |

DONLEY J. STOCKING, Primary Examiner

W. J. GOODLIN, Assistant Examiner